(12) United States Patent
Koch (10) Patent No.: US 6,547,066 B2
(45) Date of Patent: Apr. 15, 2003

(54) COMPACT DISK STORAGE SYSTEMS

(75) Inventor: Richard C. Koch, Rancho Santa Margarita, CA (US)

(73) Assignee: Labelwhiz.com, Inc.

( * ) Notice: Subject to any disclaimer, the term of this patent is extended or adjusted under 35 U.S.C. 154(b) by 48 days.

(21) Appl. No.: 09/945,055

(22) Filed: Aug. 31, 2001

(65) Prior Publication Data

US 2003/0042154 A1 Mar. 6, 2003

(51) Int. Cl.[7] ............................................... B65D 85/57
(52) U.S. Cl. .................................. 206/308.1; 206/309
(58) Field of Search ............................ 206/308.1, 309, 206/310, 311, 312; 220/4.23, 4.25

(56) References Cited

U.S. PATENT DOCUMENTS

| | | | | |
|---|---|---|---|---|
| 2,344,919 A | * | 3/1944 | Kelly | 206/309 |
| 4,541,528 A | * | 9/1985 | Holmes | 206/0.82 |
| 5,101,972 A | * | 4/1992 | Hunt et al. | 206/308.1 |
| 5,176,272 A | * | 1/1993 | Ryan | 220/4.23 |
| 5,535,884 A | * | 7/1996 | Scott et al. | 206/445 |
| 5,785,399 A | * | 7/1998 | Frankeny et al. | 312/324 |
| 6,386,655 B1 | * | 5/2002 | Hung et al. | 312/9.42 |

* cited by examiner

*Primary Examiner*—David T. Fidei
(74) *Attorney, Agent, or Firm*—Kenneth W. Float (57) ABSTRACT

Portable compact disk storage systems that are designed to hold one or more circular compacts disks. The storage systems may be made as a single molded plastic embodiment or a two-part molded plastic embodiment. An exemplary compact disk storage system comprises a lower housing having a plurality of slots formed along one side thereof that are sized to receive individual compact disks therein, and a frictional pad disposed on the plurality of slots. The frictional pad provides a frictional surface that assists removal of the compact disks from the storage system. An upper housing is coupled to the lower housing by way of a living hinge. A locking mechanism is provided for locking the lower and upper housings together when the storage system is closed.

18 Claims, 6 Drawing Sheets

COMPACT DISK STORAGE SYSTEMS

BACKGROUND

The present invention relates to compact disk storage systems for storing compact disks.

A search was performed using the US Patent and Trademark patent database number of patents that searched the term "compact disk storage" and "CD storage" in the title. Forty-one patents have been issued relating to compact disk storage systems. The utility patents include U.S. Pat. No. 6,216,862 entitled "Compact disk storage case", U.S. Pat. No. 6,213,312 entitled "Compact disk storage and filing systems", U.S. Pat. No. 6,086,170 entitled "Combination compact disk storage box", U.S. Pat. No. 6,027,186 entitled "Compact disk storage assembly", U.S. Pat. No. 6,007,167 entitled "Compact disk storage cabinet", U.S. Pat. No. 5,959,964 entitled "Computer disk and audio compact disk storage with a plurality of ribs extending in from upright walls", U.S. Pat. No. 5,950,821 entitled "Compact disk storage case", U.S. Pat. No. 5,921,405 entitled "Device for storing and arranging a plurality of compact disk storage cases against a wall", U.S. Pat. No. 5,870,357 entitled "Multidisk CD-storage, retrieval, and playback system including an elevator system having a gripper and front and rear pushers", U.S. Pat. No. 5,833,331 entitled "Compact disk storage box associated with a front panel of a computer case", U.S. Pat. No. 5,826,729 entitled "Cabinet or CD storage rack with individual compartments", U.S. Pat. No. 5,816,393 entitled "CD storage module", U.S. Pat. No. 5,813,740 entitled "Compact disk storage tower associated with a computer case", U.S. Pat. No. 5,797,487 entitled "Lockable compact disk storage apparatus", U.S. Pat. No. 5,755,497 entitled "Compact disk storage compartment of computer cases", U.S. Pat. No. 5,720,387 entitled "Compact disk storage compartment", U.S. Pat. No. 5,715,970 entitled "Compact disk storage case apparatus", U.S. Pat. No. 5,634,563 entitled "CD storage rack", U.S. Pat. No. 5,622,270 entitled "Compact disk storage and display system", U.S. Pat. No. 5,613,745 entitled "Auxiliary compact disk storage case", U.S. Pat. No. 5,590,767 entitled "CD storage box", U.S. Pat. No. 5,584,398 entitled "CD storage rack and lamp assembly", U.S. Pat. No. 5,547,086 entitled "Video compact disk storage rack", U.S. Pat. No. 5,515,979 entitled "Simplified jewel case management and opening for compact disk storage systems", U.S. Pat. No. 5,439,119 entitled "CD Storage and display system", U.S. Pat. No. 5,301,819 entitled "Compact disk storage rack", U.S. Pat. No. 5,117,984 entitled "Adjustable CD storage rack", U.S. Pat. No. 5,031,779 entitled "Compact disk storage carousel", and U.S. Pat. No. 4,932,522 entitled "CD storage with automatic opening device.

The design patents include U.S. Pat. No. D435,188 entitled "CD storage sleeve", U.S. Pat. No. D428,754 entitled "Compact disk storage rack", U.S. Pat. No. D428,752 entitled "Compact disk storage rack", U.S. Pat. No. D426,099 entitled "CD storage page", U.S. Pat. No. D415,921 entitled "Compact disk storage rack", U.S. Pat. No. D409,431 entitled "Compact-disk storage case", U.S. Pat. No. D403,196 entitled "CD storage tower with central storage unit", U.S. Pat. No. D383,936 entitled "CD storage unit". U.S. Pat. No. D381,236 entitled "CD storage tower with central storage unit", U.S. Pat. No. D364,512 entitled "CD storage tower", U.S. Pat. No. D360,799 entitled "CD storage tower", and U.S. Pat. No. D293,396 entitled "Compact disk storage unit.

It is believed that none of these cited patents discloses or suggests a compact disk storage system that is similar to the present design. It is an objective of the present invention to provide for a compact disk storage system for use in storing compact disks that improves upon the above designs.

SUMMARY OF THE INVENTION

To accomplish the above and other objectives, the present invention provides for improved portable compact disk storage systems that are designed to hold one or more circular compacts disks, including conventional compact disks (CDs), digital video disks, recordable CDs (CDR), recordable read-writable CDs (CDRW), and mini compact disks. The present portable compact disk storage systems include a single molded plastic embodiment and a two-part molded plastic embodiment.

Each of the embodiments comprises a lower housing or storage unit, and an upper housing, which forms a cover or lid. In the single molded plastic embodiment, the upper and lower housings are connected by way of a living hinge and are molded as a single unit. In the two-part molded plastic embodiment, the upper and lower housings are separate units, and one of the housings is configured to have a living hinge that is attached to a clip that mates with and attaches to the other one of the housings.

The compact disk storage system thus opens and closes in the manner of a clamshell. When the lower housing and upper housing are closed, the compact disk storage system has a cylindrical shape.

The lower housing or storage unit is semicircular in cross section and has a plurality of raised generally parallel ribs that extend inward from an outer edge of the lower housing. Inner edges of the raised ribs extend into the interior of the lower housing at selected distances so that they contact various points on compact disks that are placed in the storage system. Thus, the compact disks rest on edges of the raised ribs.

The lower housing or storage unit has a plurality of slots formed along one side thereof that are sized to hold individual compact disks between adjacent slots. Upper edges of the plurality of slots adjacent to a flat edge of the semicircular lower housing or storage unit, although this is not absolutely required. Lateral edges of the plurality of slots are generally transverse to the flat edge of the semicircular lower housing or storage unit, although this is not absolutely required. A raised rib is formed within the confines of the plurality of slots that is used as a pivot edge or surface for removing compact disks from the storage system.

Compact disks, when placed in the compact disk storage system thus rest on the edges of the plurality of raised ribs and are retained therein. The upper half of each compact disk is exposed above the flat edge of the semicircular lower housing or storage unit.

A rubber pad is disposed on top of the plurality of slots. An inner edge of the rubber pad provides a frictional surface that assists in removal of the compact disks from the storage system. During removal, a compact disk is rotated toward the rubber pad and rotates upward over the pivot edge or surface provided by the raised rib. The compact disk is then rotated over the rubber pad to fully remove it.

The upper housing, comprising the cover or lid, is semicircular in cross section and has a flat edge that abuts the flat edge of the lower housing when the upper housing is closed on the lower housing. The upper housing is attached to and rotates relative to the lower housing or storage unit by way of the living, hinge, whether the upper and lower housings are a single molded unit, or if the upper and lower housings are individual units that are connected by way of the clip that includes a living hinge that is part of one housing and attaches to the other housing.

The storage system has locking mechanism comprising a tab with a hole in it that extends beyond the flat edge of the upper housing that mates with and is captivated by a raised button on an outside edge of the lower housing.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
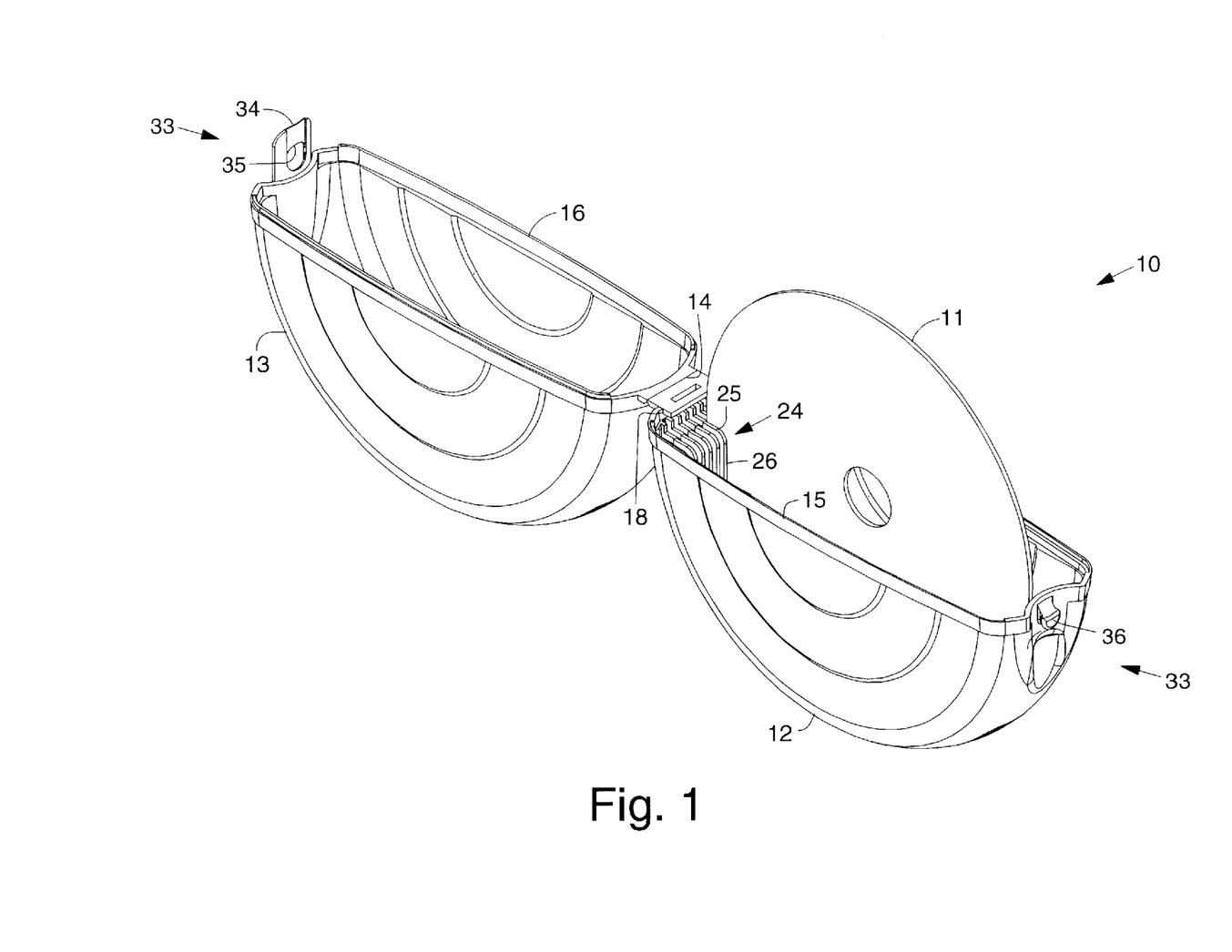
FIG. 1 is a perspective view showing exemplary embodiments of compact disk storage systems in accordance with the principles of the present invention.
Figure 2:
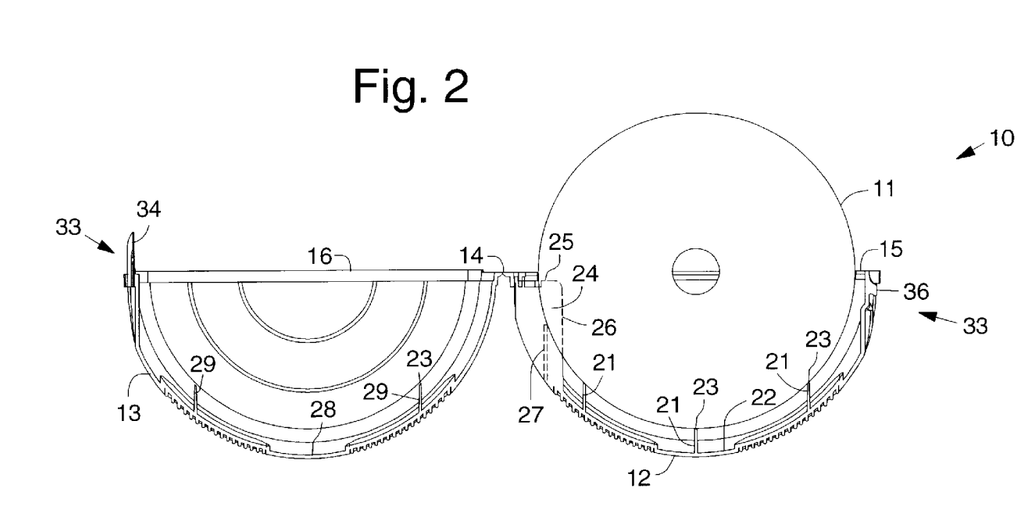
FIG. 2 is a cross-sectional side view of the compact disk storage system shown in FIG. 1.
Figure 3:
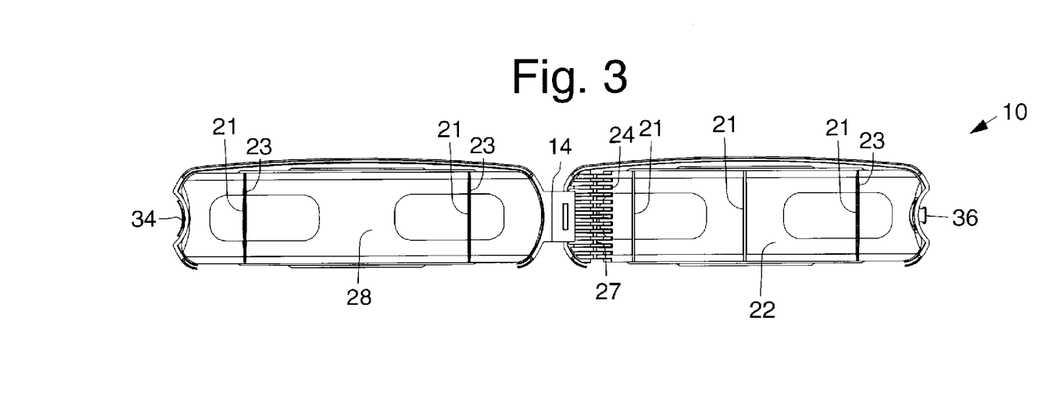
FIG. 3 is a top view of the compact disk storage system shown in FIG. 1.

Referring to the drawing figures, FIG. 1 is a perspective view showing exemplary embodiments of compact disk storage systems 10 or case 10 in accordance with the principles of the present invention. The portable compact disk storage system 10 shown in FIG. 1 may be a single molded plastic embodiment or a two piece molded plastic embodiment. FIG. 2 shows a cross-sectional side view of the compact disk storage system 10 shown in FIG. 1. FIG. 3 shows a top view of the compact disk storage system 10 shown in FIG. 1.

The compact disk storage system 10 portable and is used to store or hold one or more circular compacts disks 11. Examples of compacts disks 11 that may be employed with the compact disk storage system 10 include conventional audio compact disks (CDs), digital video disks, recordable CDs (CDR), recordable read-writable CDs (CDRW), and mini compact disks. The compact disk storage system 10 is appropriately dimensioned to accommodate the different diameter compacts disks 11.

The compact disk storage system 10 comprises a lower housing 12 or storage unit 12, and an upper housing 13, which forms a cover 13 or lid 13. In the single molded plastic embodiment of the compact disk storage system 10 shown in FIG. 1, the lower and upper housings 12, 13 are connected by way of a hinge 14, such as a living hinge 14, for example, and all components are molded as a single unit.

In the two-part molded plastic embodiment of the portable compact disk storage system 10, the lower and upper housings 12, 13 are separate units, and one of the housings 12, 13 (the upper housing 13, for example) is configured to have a living hinge 14 and a clip 18 that mates with or is captivated by and attaches to the other one of the housings 12, 13 (the lower housing 12, for example). For example, the clip 18 on the upper housing 13 may slide over an edge of the lower housing 12 and lock into place. Thus, in the two-part molded plastic embodiment, the upper and lower housings 13, 12 are attached together by way of the clip 18 and the living hinge 14 allows the upper and lower housings 13, 12 to rotate relative to each other.

The compact disk storage system 10 opens and closes in the manner of a clamshell. When the lower housing 12 and upper housing 13 are closed, the compact disk storage system 10 has a cylindrical shape.

As is shown in FIG. 2, the lower housing 12 or storage unit 12 is semicircular in cross section and has a plurality of raised generally parallel ribs 21 that extend inward from an outer edge 22 of the lower housing 12 a predetermined distance into the interior of the lower housing 12. Inner edges 23 of the raised ribs 21 extend into the interior of the lower housing 12 at selected distances so that they contact various points on compact disks 11 that are placed in the storage system 10. Thus, the compact disks 11 rest on the inner edges 23 of the raised ribs 21.

Figure 6:
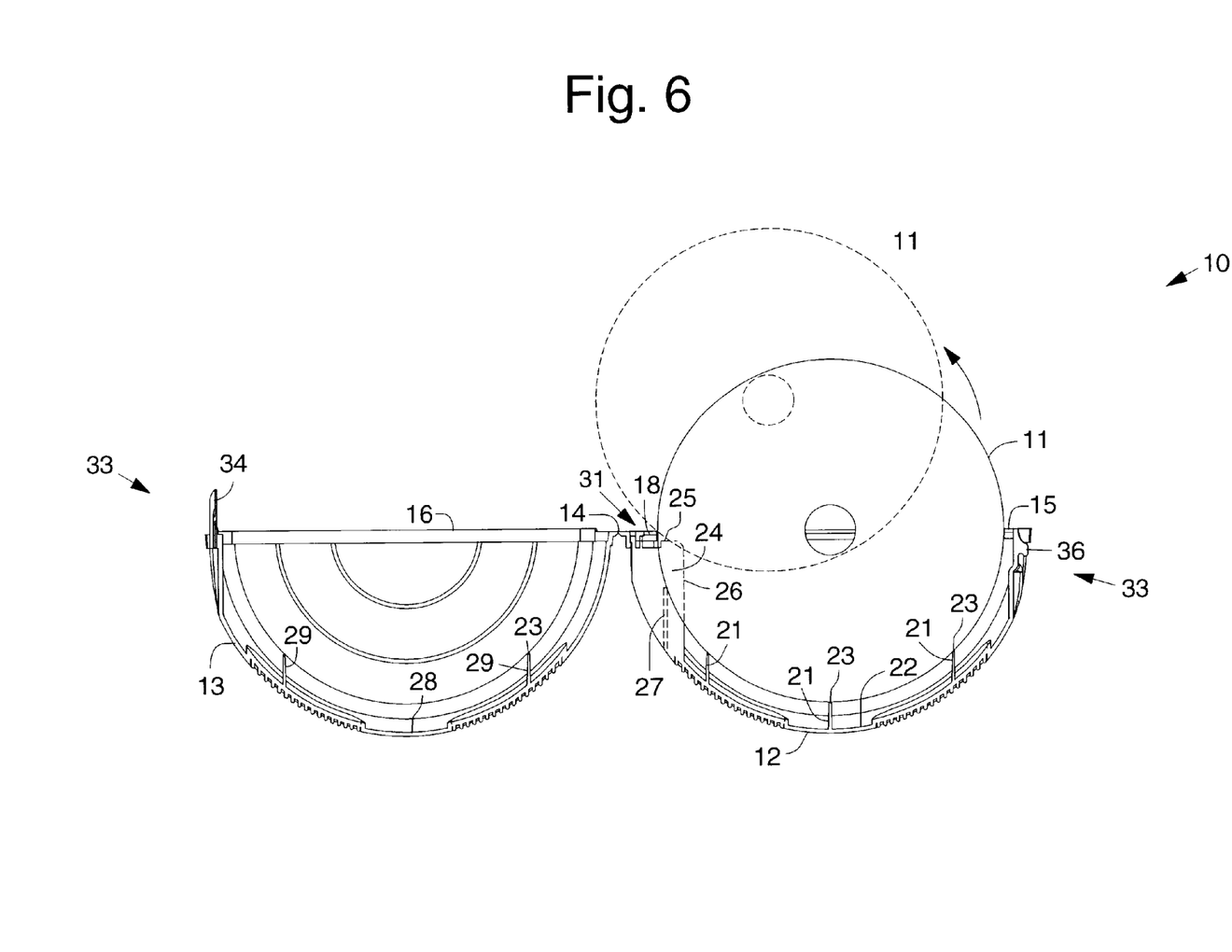
FIG. 6 illustrates operation of the compact disk storage system.

The lower housing 12 or storage unit 12 has a plurality of slots 24 formed along one side thereof that are sized to hold individual compact disks 11 therein. Upper edges 25 of the plurality of slots 24 adjacent to a flat edge 15 of the semicircular lower housing 12 or storage unit 12, although this is not absolutely required. Lateral edges 26 of the plurality of slots 24 are generally transverse to the flat edge 15 of the semicircular lower housing 12 or storage unit 12, although this is not absolutely required. A raised rib 27 (or pivoting rib 27 or step 27) shown in FIGS. 2, 3 and 6 is formed within the confines of (between respective one of) the plurality of slots 24 that is used as a pivot edge or surface for removing compact disks 11 from the storage system 10.

Compact disks 11, when placed in the compact disk storage system 10 thus rest on the edges of the plurality of raised ribs 21 and are retained in respective slots 24. The upper half of each compact disk 11 is exposed above the flat edge 15 of the semicircular lower housing 12 or storage unit 12.

Figure 5:
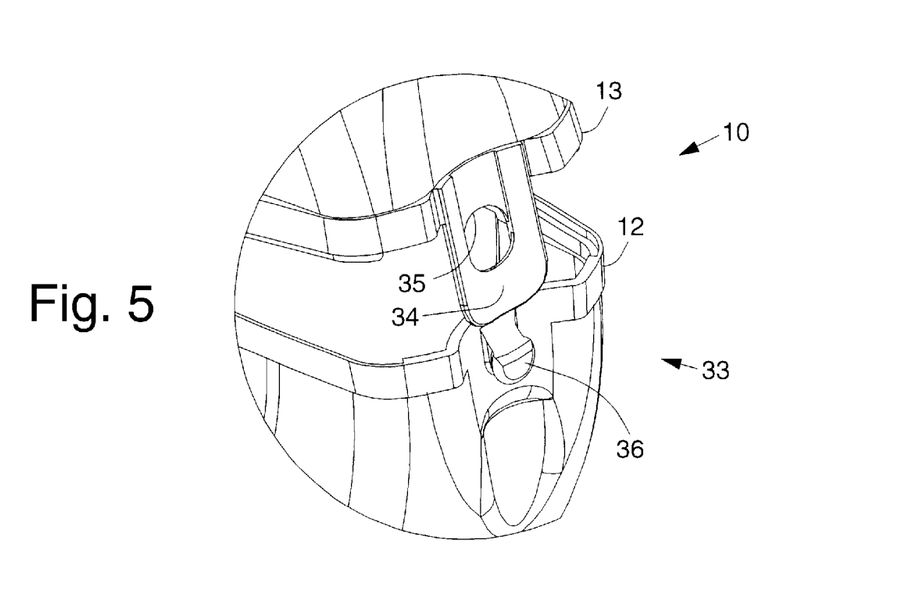
FIG. 5 is an enlarged view of the locking mechanism used in the exemplary compact disk storage system shown in FIG. 1.
Figure 7:
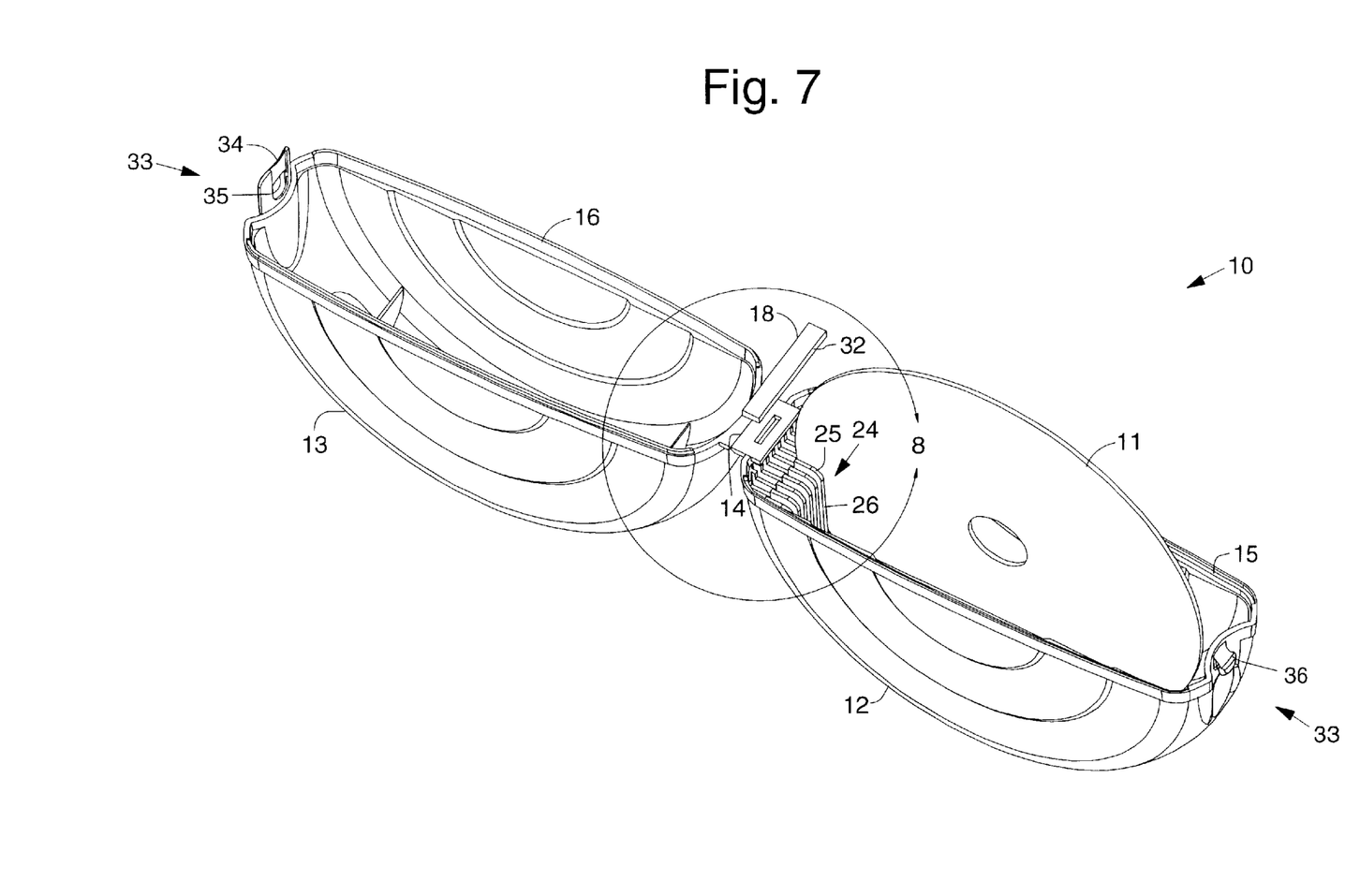
FIG. 7 is a perspective view of the compact disk storage system showing the frictional pad used therein.
Figure 8:
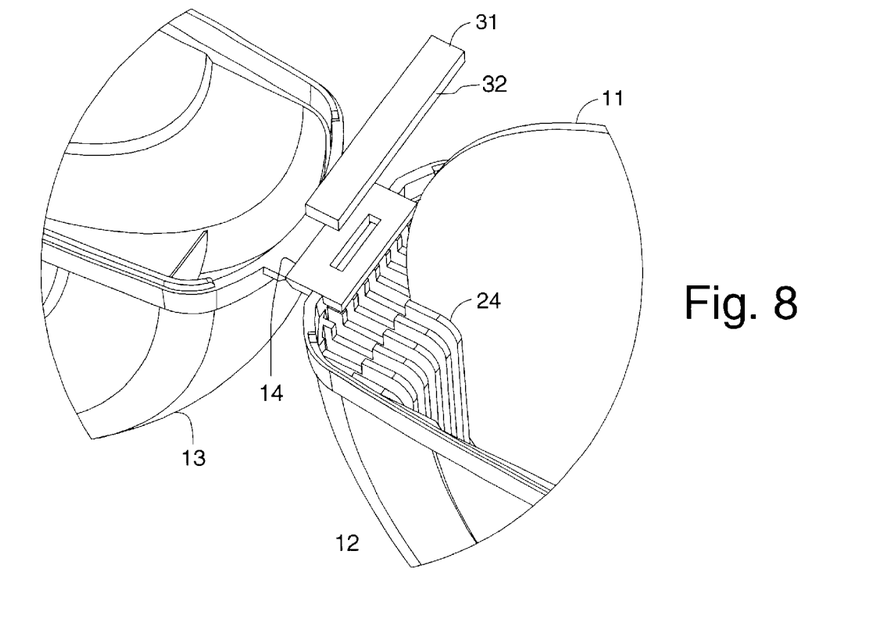
FIGS. 8 and 9 are enlarged perspective views that show details of the frictional pad used in the compact disk storage systems.
Figure 9:
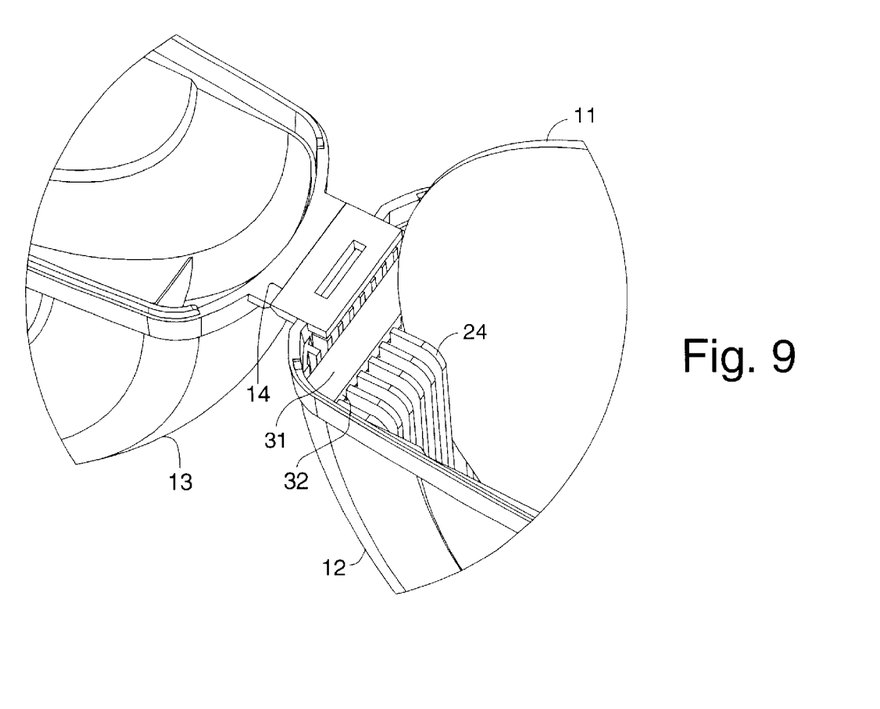

A resilient frictional pad 31, such as a rubber pad 31, for example, shown clearly in FIGS. 7–9, disposed on top of the plurality of slots 24. An inner edge 32 of the rubber pad 31 provides a frictional surface that assists in the removal of the compact disks 11 from the storage system 10. This is depicted in FIG. 5. During removal, a compact disk 11 is rotated toward the rubber pad 31 and rotates upward over the pivot surface or edge provided by the raised rib 27, or pivoting rib 27. The compact disk 11 is then rotated over the rubber pad 31 to fully remove it.

The upper housing 13, comprising the cover 13 or lid 13, is semicircular in cross section and has a flat edge 16 that abuts the flat edge 14 of the lower housing 12 when the upper housing 13 is closed on the lower housing 12. The upper housing 13 is attached to and rotates relative to the lower housing 12 or storage unit 12 by way of the living hinge 14.

As is shown in FIG. 2, the upper housing 13 has a plurality of raised generally parallel ribs 29 that extend inward from an outer edge 28 of the upper housing 13 a predetermined distance into the interior of the upper housing 13. Inner edges 23 of the raised ribs 29 extend into the interior of the upper housing 13 at selected distances so that they contact various points on compact disks 11 that are placed in the storage system 10 when the storage system 10 is in a closed position. Thus, the compact disks 11 rest on the inner edges 23 of the raised ribs 29 when the storage system 10 is in a closed position.

As is shown in FIG. 1, a locking mechanism 33 is provided that comprises a tab 34 with a hole 35 disposed therein that is located at an end of the flat surface 16 of the upper housing 13 that is distal from the living hinge 14. An enlarged view of the locking mechanism 33 is shown in FIG. 5. The locking mechanism 33 also comprises a raised button 36 that is located at an end of the flat surface 15 of the lower housing 12 that is distal from the living hinge 14.

Figure 4:
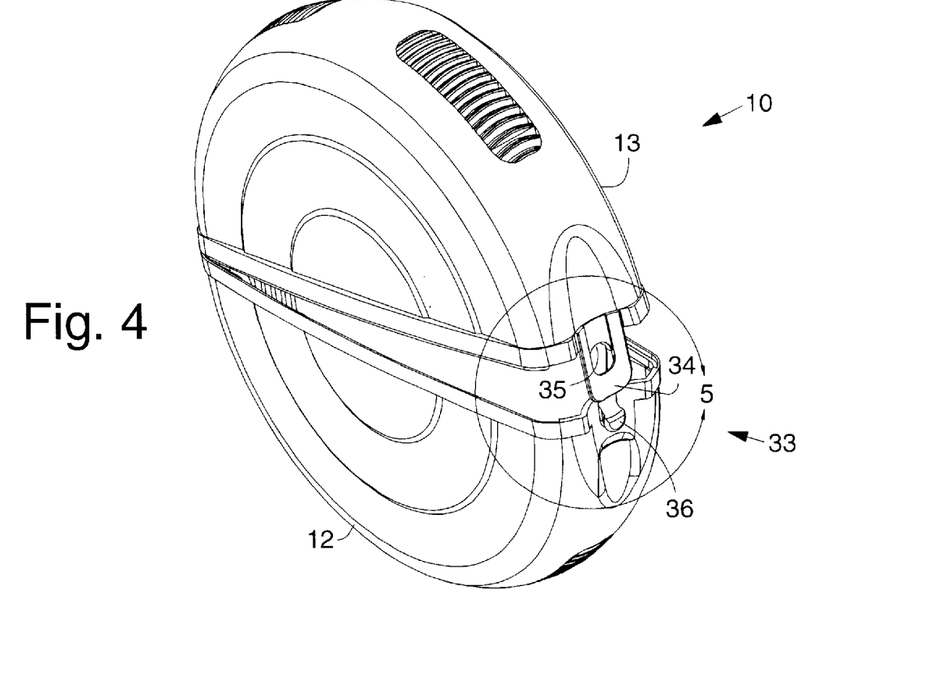
FIG. 4 is a perspective view of the compact disk storage system just prior to closure.

FIG. 4 is a perspective view of the compact disk storage system 10 just prior to closure. In this view, the upper housing 13 is almost closed on the lower housing 12. Thus, the tab 34 of the locking mechanism 33 is about to slide over the raised button 36 on the lower housing 12.

FIG. 5 an enlarged view of the locking mechanism 33 used in the compact disk storage system shown in the encircled portion of FIG. 4. The tab 34 of the locking mechanism 33 extends beyond the flat edge 16 of the upper housing 13 and mates with and is captivated by the raised button 36 on an outside edge of the lower housing 12 when the upper housing 13 is closed on the lower housing 12.

FIG. 6 illustrates operation of the compact disk storage system 10 and in particular addresses storage and removal of a single compact disk 11. To store a compact disk 11, assuming the upper housing 13 (cover 13 or lid 13) is closed on the lower housing 12, a user first opens the locking mechanism 33 by bending the tab 34 so that it is released from the raised button 36 on an outside edge of the lower housing 12. The user then rotates the upper housing 13 to expose the interior of the storage system 10.

The user then uses a finger to contact and push a compact disk 11 toward the rubber pad 31. The compact disk 11 is rotated over the pivot surface or edge of the raised rib 29 (pivoting rib 29) located within the plurality of slots 24 and against the rubber pad 31. The frictional surface provided by the rubber pad 31 allows the compact disk to be easily rotated out of the slot 24 where it can be grasped by the user.

To remove a compact disk 11 from the storage system 10, and again assuming the upper housing 13 (cover 13 or lid 13) is closed on the lower housing 12, the user opens the locking mechanism 33 by bending the tab 34 so that it is released from the raised button 36 on an outside edge of the lower housing 12. The user then rotates the upper housing 13 to expose the interior of the storage system 10.

The user then uses a finger to contact and push a compact disk 11 toward the rubber pad 31. The compact disk 11 is rotated over the pivot surface or edge of the raised rib 27 (pivoting rib 27) located within the plurality of slots 24 and against the rubber pad 31. The frictional surface provided by the rubber pad 31 allows the compact disk to be easily rotated out of the slot 24 where it can be grasped by the user.

FIG. 7 shows a perspective view of the compact disk storage system 10 showing the resilient pad 31 is a position above the plurality of slots 24 on which it is normally disposed. FIGS. 8 and 9 are enlarged perspective views that show details of the frictional pad 31, or rubber pad 31, used in the compact disk storage systems 10. In FIG. 8, the frictional pad 31 is removed from its location and is show elevated above the plurality of ribs 24. In FIG. 9, the frictional pad 31 is secured to the tops of the plurality of ribs 24, that are used to hold and align the compact disks 11 in the compact disk storage system 10. The compact disks 11 are pushed against the frictional pad 31 when they are removed from the compact disk storage system 10.

Thus, improved compact disk storage systems have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A compact disk storage system for storing compact disks, comprising:

a lower housing;

a plurality of slots formed along one side of the lower housing that are sized to receive individual compact disks therein;

a frictional surface adjacent upper edges of the plurality of slots;

an upper housing that mates with the lower housing when the storage system is closed; and a hinge formed between the lower and upper housings that allow them to rotate relative to each other.

2. The system recited in claim 1 wherein the lower housing further comprises a pivoting member formed adjacent to the plurality of slots that comprises a pivot edge for removing compact disks from the storage system.

3. The system recited in claim 1 wherein the upper housing comprises a plurality of raised ribs that extend inward from an outer edge of the upper housing into the interior thereof and which contact compact disks when they are inserted into the storage system and it is closed.

4. The system recited in claim 1 wherein the lower housing comprises a plurality of raised ribs that extend inward from an outer edge of the lower housing into the interior thereof and which contact compact disks when they are inserted into the storage system.

5. The system recited in claim 1 further comprising a locking mechanism for locking the lower and upper housings together when the storage system is closed.

6. The system recited in claim 1 which is a single-piece molded plastic structure.

7. The system recited in claim 1 wherein the lower and upper housing are molded plastic that are secured together to form a unitary structure.

8. The system recited in claim 1 wherein the locking mechanism comprises a tab having a hole disposed on one of the upper and lower housings and a raised button disposed on an exterior surface of the other of the upper and lower housings.

9. A compact disk storage system for storing compact disks, comprising:

a lower housing;

a plurality of slots formed along one side of the lower housing that are sized to receive individual compact disks therein;

a pivoting member formed adjacent to the plurality of slots that comprises a pivot edge for removing compact disks from the storage system;

a frictional surface adjacent upper edges of the plurality of slots;

an upper housing that mates with the lower housing when the storage system is closed; and a hinge formed between the lower and upper housings that allow them to rotate relative to each other.

10. The system recited in claim 9 further comprising a locking mechanism for locking the lower and upper housings together when the storage system is closed.

11. The system recited in claim 9 wherein the upper housing comprises a plurality of raised ribs that extend inward from an outer edge of the upper housing into the interior thereof and which contact compact disks when they are inserted into the storage system and it is closed.

12. The system recited in claim 9 wherein the lower housing comprises a plurality of raised ribs that extend inward from an outer edge of the lower housing into the interior thereof and which contact compact disks when they are inserted into the storage system.

13. The system recited in claim 9 which is a single-piece molded plastic structure.

14. The system recited in claim 9 wherein the lower and upper housing are molded plastic that are secured together to form a unitary structure.

15. A compact disk storage system for storing compact disks, comprising:

a lower housing;

a plurality of slots formed along one side of the lower housing that are sized to receive individual compact disks therein;

a frictional pad disposed on the plurality of slots;

an upper housing that mates with the lower housing when the storage system is closed; and a hinge formed between the lower and upper housings that allow them to rotate relative to each other.

16. The system recited in claim 15 further comprising a pivoting member formed adjacent to the plurality of slots that comprises a pivot edge for removing compact disks from the storage system.

17. The system recited in claim 15 further comprising a locking mechanism for locking the lower and upper housings together when the storage system is closed.

18. The system recited in claim 15 wherein the upper and lower housings each comprise one or more raised ribs that extend inward from an outer edge of the housing into the interior thereof and which contact compact disks when they are inserted into the storage system and it is closed.

\* \* \* \* \*